United States Patent

[11] 3,604,811

| [72] | Inventor | James M. McMenmin<br>Livonia, Mich. |
|------|----------|--------------------------------------|
| [21] | Appl. No. | 846,213 |
| [22] | Filed | July 30, 1969 |
| [45] | Patented | Sept. 14, 1971 |
| [73] | Assignee | Teeg Research, Inc.<br>Detroit, Mich. |

[54] SHAFT POSITION ENCODERS
13 Claims, 2 Drawing Figs.

| [52] | U.S. Cl. | 356/152,<br>356/117, 250/231 SE |
|------|----------|--------------------------------|
| [51] | Int. Cl. | G01b 11/26 |
| [50] | Field of Search | 356/141,<br>152, 117; 250/231 SE, 232 |

[56] References Cited
UNITED STATES PATENTS

| 2,503,023 | 4/1950 | Berry | 250/232 |
| 3,306,159 | 2/1967 | Beall, Jr. et al. | 250/231 SE |
| 3,316,799 | 5/1967 | Daly et al. | 250/225 |
| 3,412,256 | 11/1968 | Cronin | 250/231 SE |

*Primary Examiner*—Rodney D. Bennett, Jr.
*Assistant Examiner*—S. C. Buczinski
*Attorney*—Hauke, Gifford and Patalidis ABSTRACT: An instrument capable of determining with precision the angular position of a shaft by projecting a plurality of beams of modulated polarized light through an analyzer rotating in unison with the shaft. The signal derived from the light passing through the analyzer is compared to the modulation input of one of the beams, with the resultant signal being representative of the shaft angular position.

PATENTED SEP 14 1971

3,604,811

INVENTOR
JAMES M. McMENAMIN

BY Hawke, Gifford & Patalidis

ATTORNEYS

SHAFT POSITION ENCODERS

BACKGROUND OF THE INVENTION

The need for precision angle measurement has long been recognized in many fields, especially in the area of celestial navigation. The demand for small instruments with great resolution, capable of operating in extreme environments, has outrun the potential of electromechanical devices. Optical disc-type encoders belong to the mechanical category, since their successful operation depends on the extent to which extremely close mechanical tolerances can be held in their manufacture. A satisfactory solution of the problem of manufacturing high precision and high sensitivity shaft encoders demands an entirely new approach rather than a limited attempt to refine the machinist's craft.

CROSS-REFERENCE TO RELATED APPLICATIONS

This application is related to application Ser. No. 472,402, filed July 13, 1965 and application Ser. No. 617,967, filed Feb. 23, 1967.

SUMMARY OF THE INVENTION

The present invention is based on a new approach employing polarized light. An instrument based on the principle of the invention is a compact, high resolution device having essentially no moving parts. The resolution of a shaft encoder, according to the present invention, is better than 12 bits. The small size and inherent ruggedness of such an instrument make it ideally suitable for virtually any industrial or military application.

An object of the invention, therefore, is to provide a shaft position encoder of high precision and high sensitivity. Another object of the invention is to provide a shaft position encoder having no or few moving parts, immune to gravity and acceleration, made of a few readily available components and capable of operating in extreme environments for long periods of time. Other objects and advantages of the invention will become apparent when the following specification is considered in connection with the attached drawings wherein:

Figure 1:
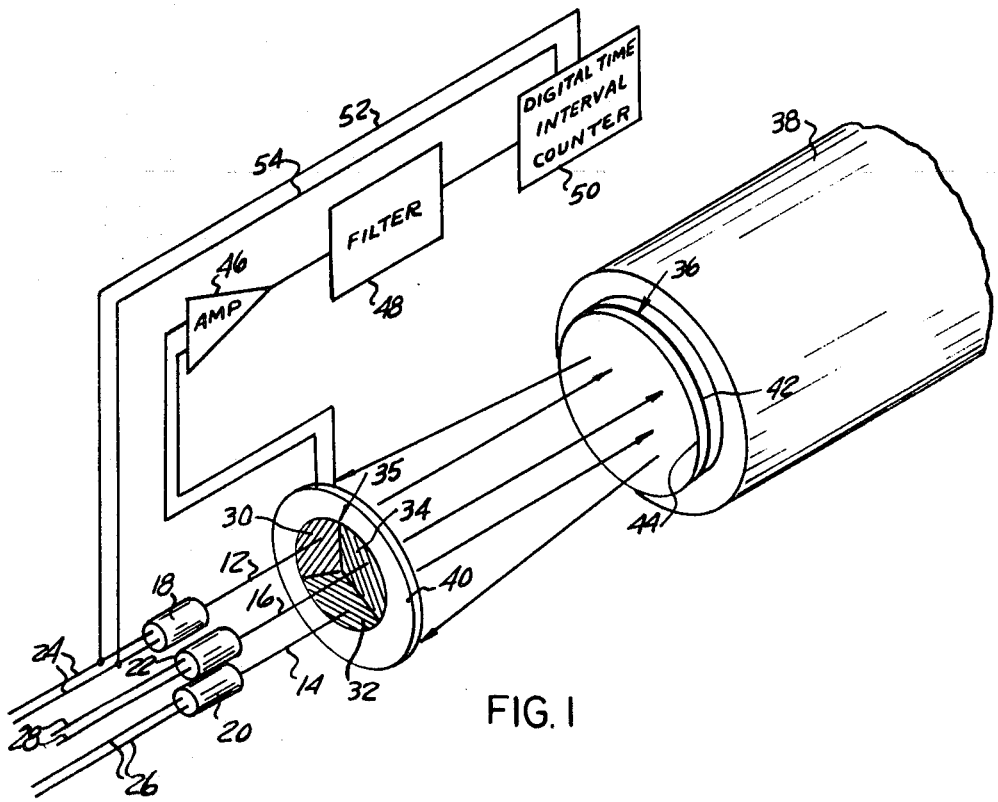
FIG. 1 is a schematic representation of an example of a shaft encoder according to the present invention.

The three beams of modulated light 12, 14 and 16 pass through three individual polarizers 30, 32 and 34, respectively, mounted in front of each source and forming a disklike polarizer assembly 35. The principal axis of each polarizer is positioned at an angle relative to an arbitrary reference, with polarizer 30 being positioned at an angle $\epsilon$ relative to the arbitrary reference, polarizer 32 being positioned at an an angle $\epsilon + \pi/3$ and polarizer 34 being positioned at an angle $\epsilon + 2\pi/3$ relative to the arbitrary reference. By this arrangement, the three beams of modulated light emerging from the polarizer are polarized at 60° with respect to one another.

The three beams of modulated polarized light emerging from the three polarizers of the polarizer assembly 35 are reflected from a mirror-analyzer transducer 36 attached to the end of the rotating shaft 38 and impinge upon a detector 40 in the form of a ring disposed on the periphery of the assembly 35. The mirror-analyzer transducer 36 comprises a mirror portion 42 on the surface of which is attached the analyzer portion 44 which may generally consist of a polarizing filter or film.

The voltage output of the detector 40, after passing through an amplifier 46 and a filter 48, is of the form: $e = KE [\sin \omega t \cos^2 \theta - \sin (\omega t + \pi/3) \cos^2(\theta + \pi 13) + \sin (\omega t + 2\pi/3) \cos^2(\theta + 2\pi/3)]$ (1) where K accounts for optical losses and detector conversion. This equation can be simplified to: $e = 3KE \sin (\omega t + 2\theta)$ (2) where $\theta$ is the angular position of the mirror-analyzer transducer 36 relative to the reference from which the principal axis of the polarizers 30, 32 and 34 are positioned.

The output working AC signal, represented by equation (2), is applied to a digital time interval counter 50 from the output of the filter 48, and the driving voltage of the light source 18 is also fed into the counter 50, as schematically represented in FIG. 1 by lines 52 and 54 connecting the lead wires 24 of the light source 18 to the counter 50. It is evident that according to equation (2) the phase of the output voltage $KE \sin (\omega t + 2\theta)$ from the filter 48 relatively to the reference signal $E \sin \omega t$ is proportional to twice the angular position $\theta$ of the shaft 38 relative to the reference position. Thus, if the electrical phase difference between the modulating voltage for the light source 18, ($E \sin \omega t$), and the output voltage from the filter, ($3KE \sin (\omega t + 2\theta)$), is measured, in effect the angular position of the shaft 38 is being measured, the electrical phase shift corresponding to twice the mechanical angle.

Figure 2:
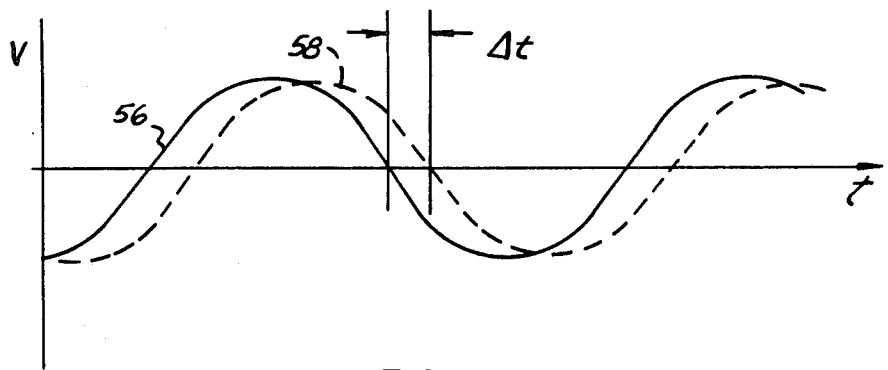
FIG. 2 is a graph useful in explaining the operation of the device of FIG. 1. Description of the Preferred Embodiment Referring now to the drawings and more particularly to FIG. 1 thereof, which represents an example of a shaft encoder according to the invention, three beams of light, 12, 14 and 16 are emitted by light sources 18, 20 and 22, respectively. The three light sources 18, 20 and 22, preferably arranged in an equilateral triangle as shown and connected to their source of power by leads 24, 26 and 28, are modulated by voltages respectively represented by $E \sin \omega t$, $E \sin (\omega t + 2/3)$ and $-E \sin (\omega t + \pi/3)$, where E is the magnitude of the applied voltage. Each light source may be a light-emitting diode, such as for example, the semiconductor infrared emitter MI 20 cl. manufactured by Monsanto of St. Louis, Mo.

Referring now to FIG. 2, there is shown a diagram representing substantially the driving voltage signal 56 applied simultaneously to the light source 18 and the digital time interval counter 50, and the resultant useful working voltage signal 58 read by the detector 40 and applied through the amplifier 46 and filter 48 to the counter 50, both curves being shown at substantially the same scale. It can be seen that the signal 58 is out of phase from the driving signal 56 by a time interval $\Delta t$, this shift in phase $\Delta t$ being a linear function of the extent of rotation of the shaft 38 as hereinbefore explained. The counter 50 thus displays a reading proportional to the time interval $\Delta t$, such reading being representative of the shaft position.

It is to be noted that the number of light sources with their respective polarizers is not restricted to three, as shown in FIG. 1, but may be any plurality. The plurality of light sources would be modulated by voltages having phases that are substantially equally spaced with respect to one another. Each beam of light from the plurality of light sources would pass through a polarizer, wherein the principal axes of the polarizers are substantially equally angularly spaced with respect to one another. Therefore, the shaft encoder may be constructed using any number of light sources greater than one, wherein each light source has its own polarizer.

Referring again to FIG. 1, it is to be noted that the mirror 42 may be omitted in applications where the detector 40 can be placed within the shaft 38, or proximate the other end of the shaft with an appropriate aperture through the longitudinal axis of the shaft to afford a path for the beams of light 12, 14 and 16. It will also be evident to those skilled in the art that the detector 40 may be any optical-electrical transducer and that the digital time interval counter 50 may be replaced by an analog display.

It is important that certain unique aspects of an encoder according to the hereinbefore explained embodiment of the invention be emphasized, such as its freedom from mechanical coupling. True optical coupling is maintained between the encoder head and the rotating shaft 38. The shaft carries an optical transducer 36 which may be made as small as 4 millimeters is diameter by 1.7 millimeters thick with a weight of approximately 50 milligrams. This weight constitutes the only mechanical load imposed on the rotating shaft by the encoder head, and, as mentioned above, by eliminating the mirror 42 by placing the detector 40 proximate the other end of the shaft, this weight could still be further reduced.

Furthermore, since no bearings whatsoever are incorporated in the device, starting and running torques are nil. This bearing-free design permits the easy adaptation of the encoder head to existing equipment where access to the end of a rotating shaft is readily available. The shaft may, if desired, be located some distance from the encoder.

It should also be emphasized that readout is sensitive only to angular rotations of the shaft 38. Transducer motions generated by shaft end play and runout are ignored.

Having thus described the invention, what I claim is:

1. An optical shaft position encoder comprising: means for producing a plurality of beams of modulated light, said beams of modulated light having phases that are substantially equally spaced with respect to one another; a polarizer for each beam of modulated light, the principal axes of the polarizers being substantially equally angularly spaced with respect to one another; means for analyzing said beams of light, said last mentioned means being adapted to be rotated in unison with the shaft; and means deriving from said analyzing means a signal representative of the angular position of the shaft.

2. The optical shaft position encoder of claim 1, wherein the means deriving the signal representative of the angular position of the shaft compares a first signal obtained from the beams of light after passage through said analyzing means with a second signal driving one of said means for producing a plurality of beams of modulated light.

3. The optical shaft position encoder of claim 1, wherein the means deriving a signal representative of the angular position of the shaft is a digital time interval counting means.

4. The optical shaft position encoder of claim 1, wherein the means for producing a plurality of beams of modulated light is a plurality of light-emitting diodes.

5. The optical shaft position encoder of claim 4, wherein the plurality of light sources are modulated by driving voltages having phases that are substantially equally spaced with respect to one another.

6. The optical shaft position encoder of claim 5, wherein the means deriving the signal representative of the angular position of the shaft compares a first signal obtained from the beams of light after passage through said analyzing means with one of the voltages driving one of the light sources.

7. An optical shaft position encoder comprising: means for producing a plurality of beams of modulated light, said beams of modulated light having phases that are substantially equally spaced with respect to one another; a polarizer for each beam of modulated light, the principal axes of the polarizers being substantially equally angularly spaced with respect to one another; means for analyzing said beams of light, said last-mentioned means being adapted to be rotated in unison with the shaft; and means deriving from said analyzing means a signal representative of the angular position of the shaft by comparing the signal emerging from said analyzing means with a signal representative of one of said beams of modulated light.

8. The optical shaft position encoder of claim 7, wherein the means deriving a signal representative of the angular position of the shaft is a digital time interval counting means.

9. The optical shaft position encoder of claim 7, wherein the means for producing a plurality of beams of modulated light is a plurality of light sources driven by modulated voltages with phases substantially equally spaced with respect to one another.

10. An optical shaft position encoder comprising: a plurality of light sources emitting a plurality of beams of modulated light, said sources being driven by a plurality of modulated voltages with phases substantially equally spaced with respect to one another; a polarizer for each beam of modulated light, the principal axes of the polarizers being substantially equally angularly spaced with respect to one another; an analyzer mounted on one end of a rotating shaft whose angular position is to be determined; detector means adapted to supply an electrical signal in function of the intensity of the light impinging thereon; a mirror placed behind said analyzer toward said detector means and a digital time interval counter electrically connected to said detector means and adapted to compare an electrical signal representative of one of the modulated voltages with said electrical signal from said detector means, whereby the phase differential between said electrical signals is representative of the angular position of the shaft.

11. The optical shaft encoder of claim 10, wherein the means deriving a signal representative of the angular position of the shaft is a digital time interval counting means.

12. The optical shaft position encoder of claim 10, wherein, the plurality of light sources consists of three sources driven by three modulated voltages with electrical phase differences of 120°.

13. The optical shaft position encoder of claim 12, wherein the principal axes of the polarizers are rotated approximately 60° with respect to one another.

TRI-107-A-3

UNITED STATES PATENT OFFICE
CERTIFICATE OF CORRECTION

Patent No. 3,604,811      Dated September 14, 1971

Inventor(s) JAMES M. McMENAMIN

It is certified that error appears in the above-identified patent and that said Letters Patent are hereby corrected as shown below:

<u>IN THE TITLE BLOCK</u>

Correct the spelling of inventor's name to

- - James M. McMenamin - -

<u>IN THE SPECIFICATION</u>

Column 1, line 57, before "and" change "$(\omega t + 2/3)$" to - - $(\omega t + 2\pi/3)$ - - line 68, cancel "an" (2nd occurrence)

Column 2, line 9, change the term "$(\theta + \pi 13)$" to - - $(\theta + \pi/3)$ - - change the term "++sin" to - - +sin - - line 72, change "is" to - - in - -

Signed and sealed this 28th day of March 1972.

(SEAL)
Attest:

EDWARD M. FLETCHER, JR.      ROBERT GOTTSCHALK
Attesting Officer      Commissioner of Patents